(No Model.) 4 Sheets—Sheet 1.
A. GOODYEAR.
GRAIN BINDER.
No. 374,595. Patented Dec. 13, 1887.
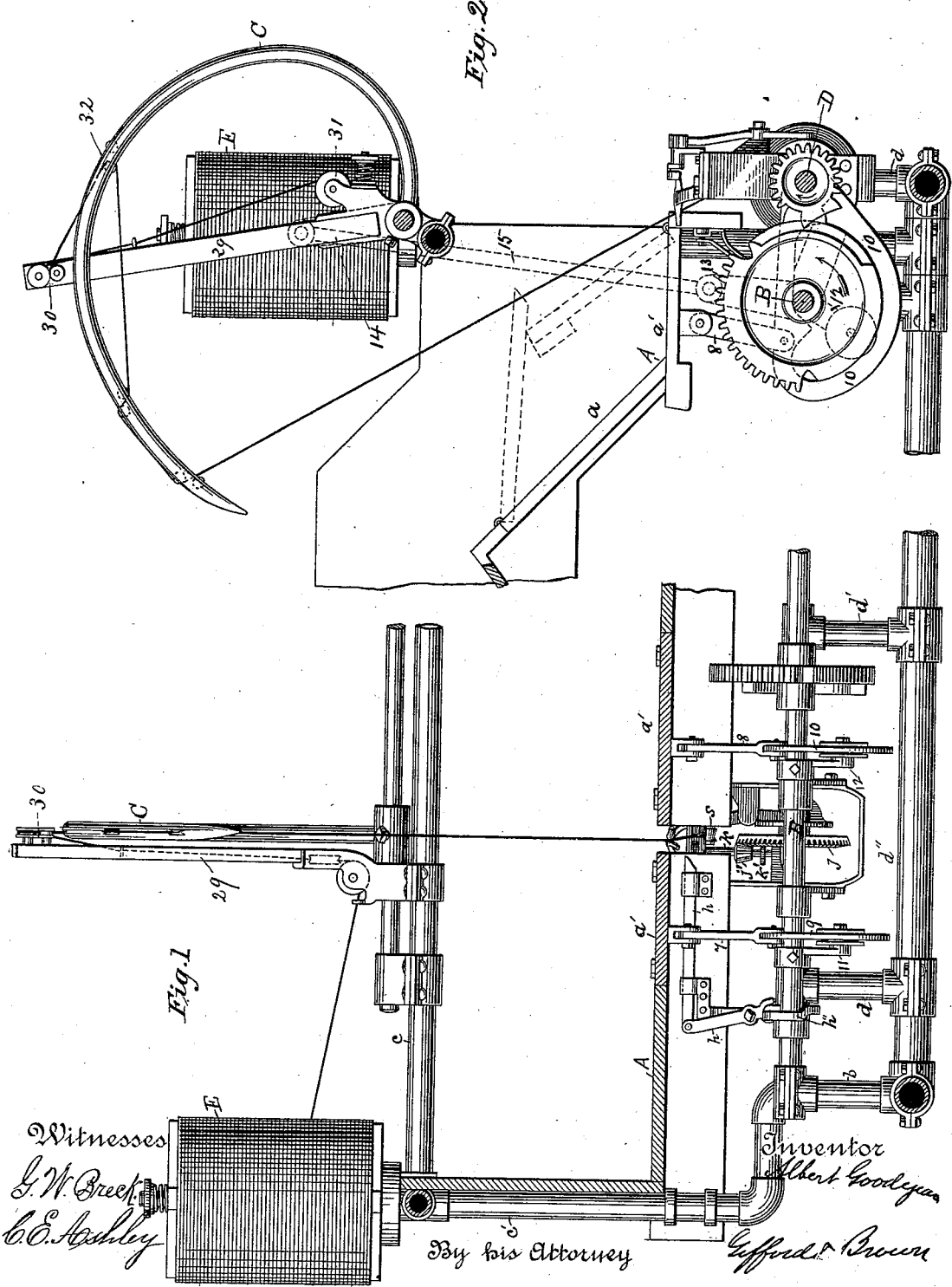

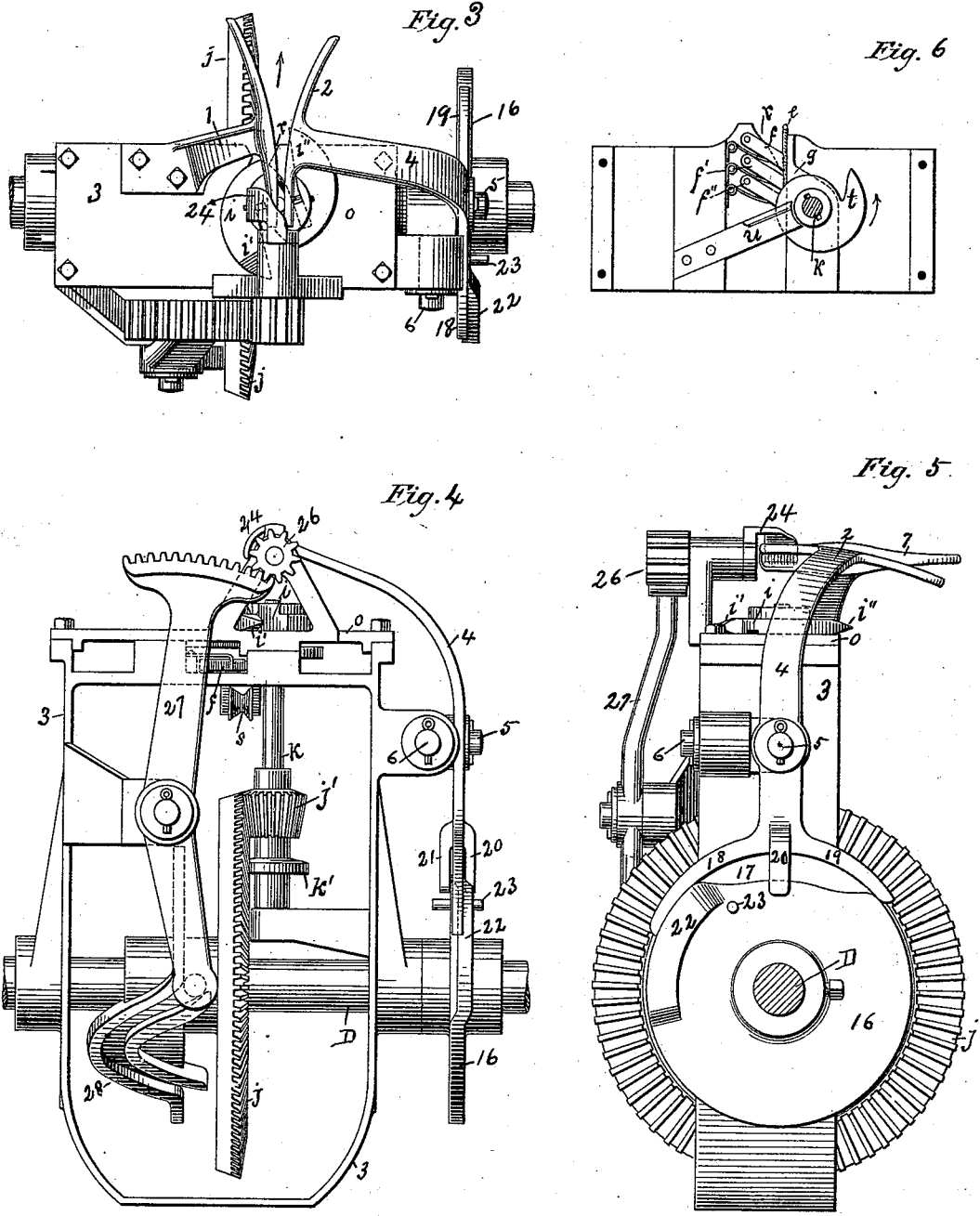

(No Model.) 4 Sheets—Sheet 3.
A. GOODYEAR.
GRAIN BINDER.
No. 374,595. Patented Dec. 13, 1887.
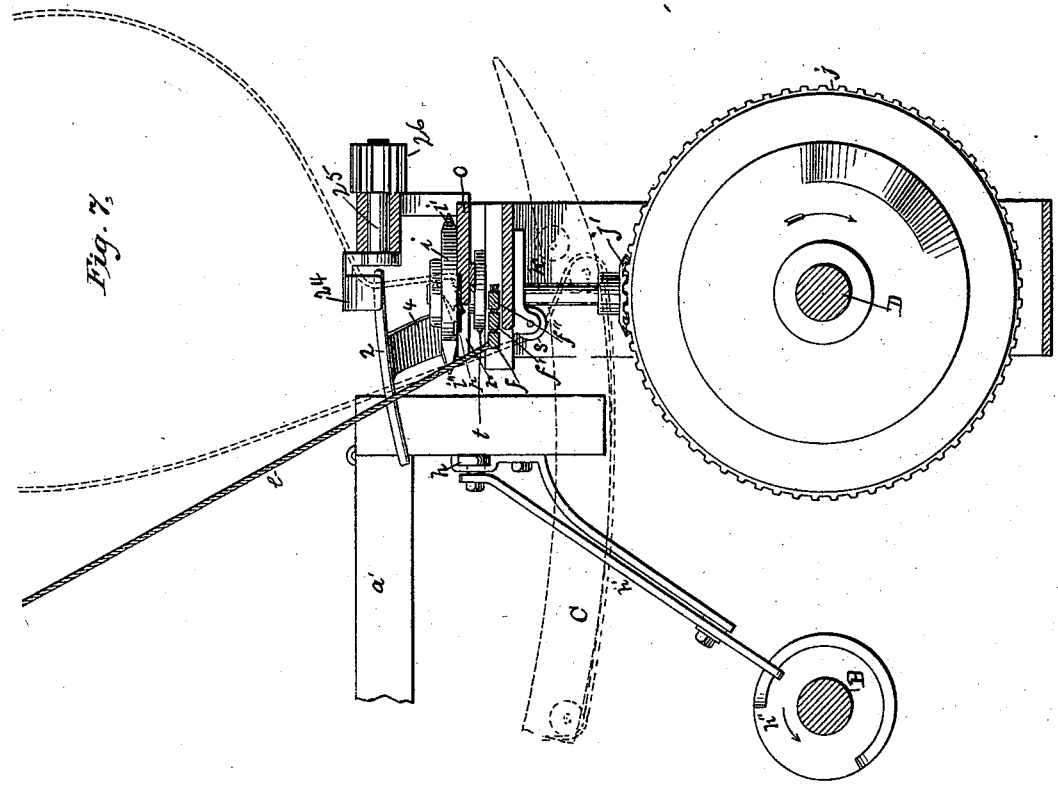
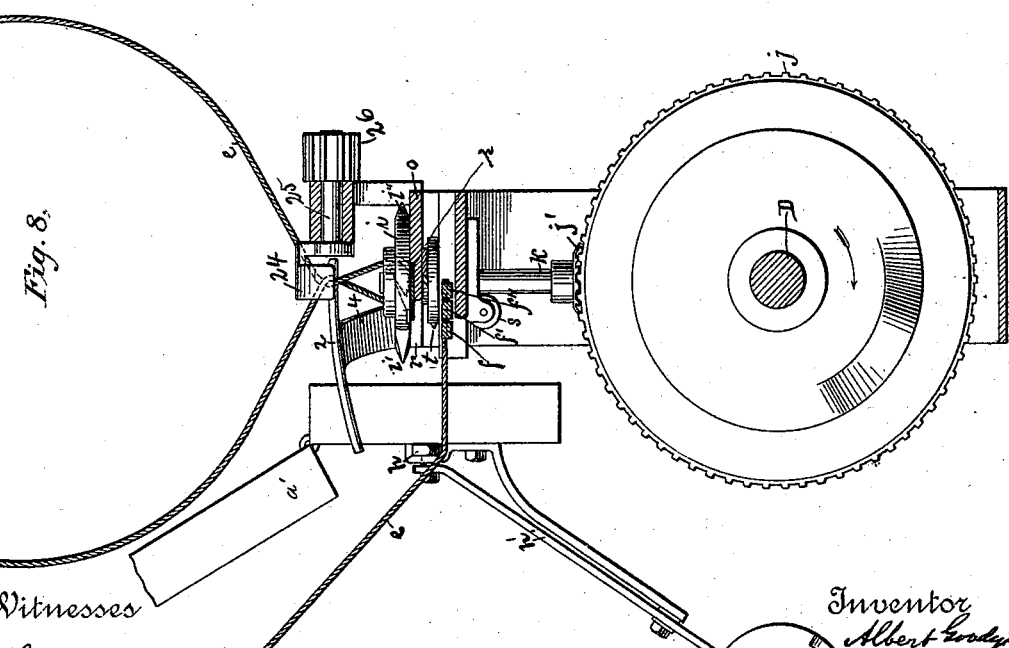

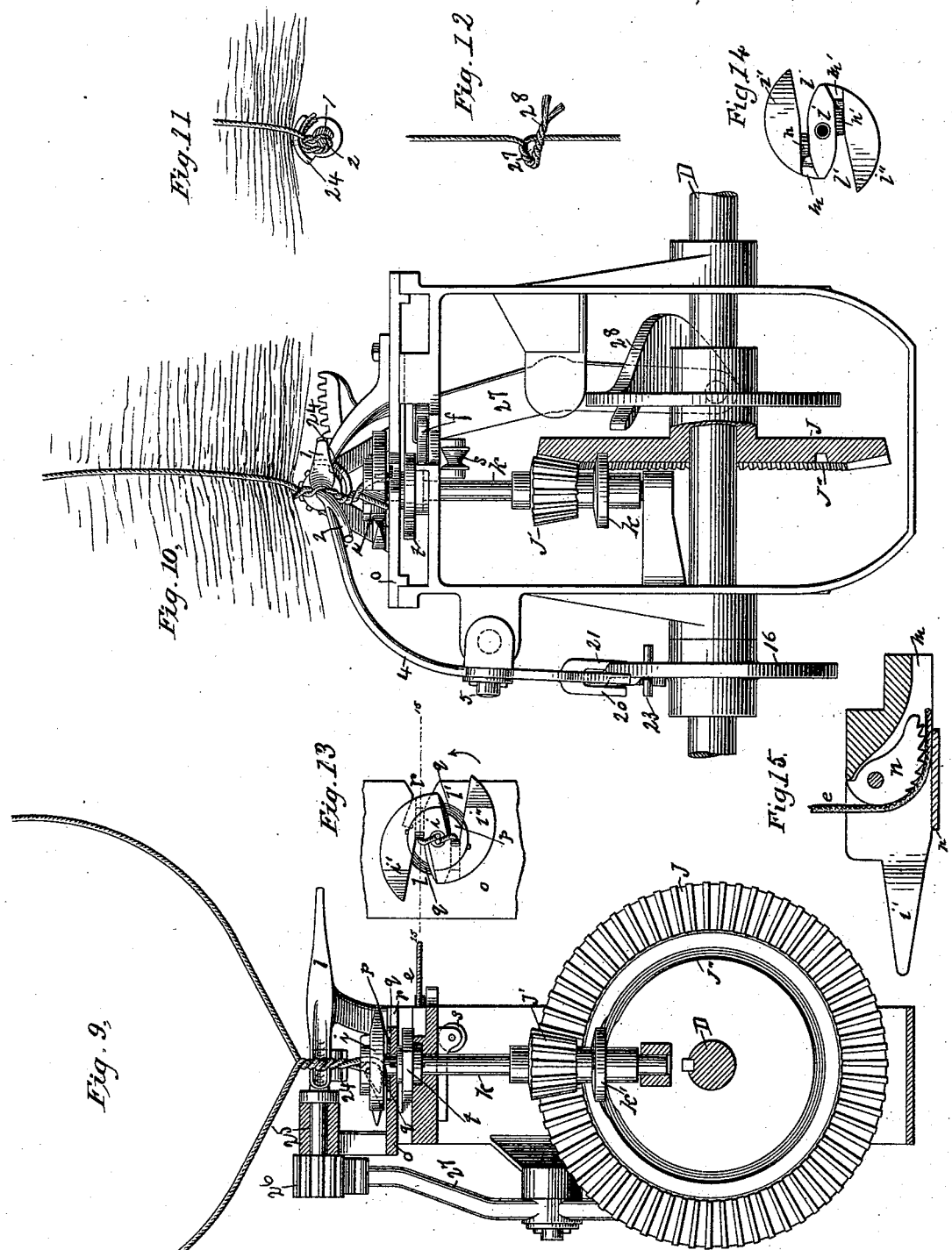

UNITED STATES PATENT OFFICE.

ALBERT GOODYEAR, OF NEW HAVEN, CONNECTICUT.

GRAIN-BINDER.

SPECIFICATION forming part of Letters Patent No. 374,595, dated December 13, 1887.

Application filed August 2, 1886. Serial No. 209,720. (No model.)

*To all whom it may concern:*

Be it known that I, ALBERT GOODYEAR, of New Haven, Connecticut, have invented a new and useful Improvement in Grain-Binders, of which the following is a specification.

This invention provides an improvement on the contrivance which is the subject of Letters Patent No. 266,284, granted to me October 24, 1882.

In the drawings, Figure 1 shows the binding mechanism and sufficient of a harvester to show the combination between the former and the latter, looking toward the point of the needle. Fig. 2 shows the same thing looking toward the side of the needle. Fig. 3 is a plan view of the twisting, clamping, and tucking mechanism. Fig. 4 is a side view of the same looking transversely of the shaft. Fig. 5 is a side view of the same looking parallel with the shaft. Fig. 6 is a detail showing the mechanism for holding the end of the twine and cutting. Fig. 7 is a side view, partly in section, showing in dotted lines the position of the twine and needle in its lowermost position. Fig. 8 is a side view showing the twine surrounding the bundle as partially twisted and as cut loose from the main supply of the cord, the end of which is held by the holding-dogs. Fig. 9 is a side view, partly in section, looking lengthwise of the shaft, showing the twine as completely twisted and in position to be held by the clamps (only one of which is shown) ready to be acted on by the tucker. Fig. 10 is a side view of the same thing looking transversely of the shaft. Fig. 11 is a detail showing the twine surrounding the bundle and the twisted end being tucked under by the tucker, forming a loop around the clamp. Fig. 12 shows the twisted end of the cord tucked under and forming the loop. Fig. 13 is a detail showing a plan view of the twister. Fig. 14 shows the under side of the twister. Fig. 15 is a section of the twister through the line 15 15, Fig. 13, showing the dog for holding the end of the twine.

Having reference to the drawings, I will now proceed to describe the machine; but though I have shown in said drawings and will describe the form of mechanism in which I prefer to embody my invention, yet I do not limit myself to the said form, since I am aware that in carrying out my invention various modifications and changes will suggest themselves within the principle of my invention.

A is the platform upon which the grain is delivered by the harvesting-machine to be bound. $a\ a'$ are hinged sections of this platform opening upward.

B is a shaft, which is driven from the ground-wheel of the harvester, and which serves to give motion to mechanisms connected with the platform A, and also to the needle, which is lettered C, and also to the twisting and other mechanism mounted upon the shaft D, which latter shaft is the main shaft of the binding apparatus.

The frame of the harvesting-machine is preferably made of pipe or tubing, as more fully described in another application filed at even date herewith. The shaft D has its bearings on uprights $d\ d'$, which are clipped, as shown in Fig. 1, to the cross tube $d^2$, which constitutes the end of the bed-frame of the harvester. By being clipped, as shown, to said cross-tube, the uprights $d\ d'$ are adjustable lengthwise on the same. The shaft B likewise has its bearings on uprights, as at $b$. So has also the shaft of the needle C on a cross-tube, $c$, from the upright $c'$. Each of these uprights is connected by a clip, as shown, with the tubing of the main frame, so that each may be adjusted lengthwise of said part of the frame.

The twine to be used for binding should be tarred, and is wound upon a reel, E, passing thence around certain rollers and guides, as shown in Figs. 1 and 2, and through the eye of the needle. Its free end is, when the operation of binding commences, held by the spring-dog $f^2$ against the shoulder $g$, connected with the frame. In the drawings I have shown three spring-dogs as holding the free end of the cord; but two of these may be omitted, as one is sufficient. The action of the dog $f^2$ is still further aided by the fact that its extremity is overlaid by the circular portion of the cutter $t$, so that the upward strain upon the cord, instead of coming directly against the dog at right angles to its surface, is changed in its direction by the fact that the cord after leaving the dog is obliged to pass under and around the edge of the circular portion of the knife $t$. This is most clearly shown in Fig. 6, where the cord or twine is lettered $e$.

Fig. 2 shows the position of the cord and the needle when the operation is about to commence, the lower end of the cord being in the position shown in Fig. 7, where it will be caught by one of the fingers of the twister $i$, which twister I will now describe.

$j$ is a bevel-gear, which is mounted upon the shaft D. This gear meshes with another bevel-gear, $j'$, which is secured to the vertical shaft $k$. Upon the face of the wheel $j$ is a recess, $j^2$, presenting a cam-surface to the flange $k'$ on the vertical shaft $k$, so that as the wheel $j$ rotates the shaft $k$ will be raised vertically, as shown in Fig. 9, at one point for each revolution of the wheel.

Upon the top of the upright shaft $k$ is the twister, which is shown most clearly in Figs. 13, 14, and 15. In plan view this twister is formed very much like an S, its body being at $i$, its extremities at $i'$ $i^2$, and the openings between its body and each extremity being lettered in Fig. 13, respectively, $l$ $l'$. Being formed as shown in Fig. 13, as this twister revolves in the direction of the arrow, any cord which is caught by either extremity will be carried toward the center to the bottom of the opening between that extremity and the body. On the under side of the twister from the bottom of each opening $l$ $l'$ extends a groove, $m$ $m'$, all the way across the twister, as shown in Figs. 14 and 15. Within each groove, and at the bottom of each opening $l$ $l'$, is placed a cam-faced dog, $n$ $n'$. Each of these dogs is fixed upon a pivot, so as to have a slight up-and-down play. Thus, when the twister lies upon a flat surface, any cord caught by the extremities $i'$ $i^2$ will be carried into the grooves $m$ $m'$, where it will be caught between the roughened surface of the cam-dog $n$ or $n'$ and the surface below the twister, and will be there held firmly so long as the twister continues to rotate in the direction of the arrow, Fig. 13, and continues to rest upon this surface. This twister, being mounted upon the top of shaft $k$, rests at its lower side upon the top of the plate $o$ at all times, excepting when it is raised by the action of the cam-faced recess $j^2$ on the flange $k'$. The beveled gears $j$ $j'$ are so made that the shaft $k$ will turn, preferably, five times for each revolution of the shaft D.

I have represented an annular groove, $q$, formed by the plate $o$, and a piece, $p$, which is shown as a loose washer separate from that plate, but may be in one piece with the plate. This piece $p$ is of sufficient diameter so that cord in the grooves $m$ $m'$ will pass between it and the dogs $n$ $n'$, the groove $q$ permitting the loose end or tail of the cord beyond the dog to move freely around without binding. When the needle is ready to descend and the free end of the cord is held by the dog, the first finger or hook of the twister which comes along as it revolves catches the cord, as shown in Fig. 7, and carries it toward the center of the twister until the end of the cord is caught in the groove $q$, where it is firmly held by the cam-dog $n$. When the twister has thus revolved far enough—one-half a revolution—to bring the end of the cord into the groove beneath the dog $n$, it stops and remains at rest until the needle has descended and starts to return. Afterward it completes its revolutions, preferably about four and a half in number.

As the twister brings the end of the cord into the groove, where it is held by the cam $n$, it disengages it from the dog or dogs $f$ $f'$ $f^2$, and the duty of holding this end of the cord is thus transferred from that dog or dogs to the cam $n$ in the groove $q$. While the free end of the cord has thus been transferred to and held by the cam $n$ in the groove $q$, the needle will have descended, so as to give the cord a wrap around the bundle of grain and bring it into the position shown in dotted lines in Fig. 7, where the cord passes from the eye of the needle around the roller $s$, and thence upward around the bundle of grain. This roller $s$ is grooved, as shown, with the apex of its groove directly below the extremities of the spring-dogs $f$ $f'$ $f^2$, so that the cord is brought into a direct line with the extremities of those dogs. The parts are now ready for the twister to resume its revolution, and as it does so the finger upon the twister which is opposite the one previously referred to catches the cord which has been brought downward by the needle and presses it in between the dog or dogs $f$, &c., and the shoulder $g$.

I will now leave the operation of the twister for a moment and describe the operation of the cutter $t$, which at this stage comes into play.

$t$ is a rotary cutter, which is secured upon the same shaft with the twister below the plate $o$, so that whenever the twister revolves this also revolves. Its cutting-edge is arranged so as to be slightly back of the finger of the twister which second came into play. A blade or shearing-edge, $u$, is located, as shown in Fig. 6, just above the knife $t$, so that the knife $t$ and this cutting-edge form shearing devices.

Now, returning to the operation of the twister, as soon as it has carried the portion of the cord last referred to under the dog or dogs $f$, the shearing devices $t$ and $u$ sever the cord between the dog or dogs $f$, leaving one free end engaged with the dogs and the other free end engaged with the twister, which, still revolving, carries this free end into the groove $q$ and under the cam $n$, where it is held while the twisting proceeds.

We have now reached a stage where the loop of cord which surrounds the bundle of grain is cut entirely free from the cord on the needle, and both ends of the loop of cord around the grain are held by the twister in the groove $u$, one end being held by the cam $n$ and the other by the cam $n'$. The continued rotation of the twister now twists the two ends of the cord surrounding the grain together, the twist being made in such direction as to untwist the twine while it twists the two ends together, having the effect of incorporating the two ends of the cord into practically one cord, which will have no tendency to untwist.

The next operation to be provided for is to clamp the twisted ends of the twine close up to the bundle, while the ends are tucked under the cord encircling the bundle. The mechanism for doing this I will now proceed to describe.

1 is one member of a clamp, and 2 is the other member. Said two members are located so that the twisted ends, extending downward to the center of the twister, will pass between them. The clamp 1 is bolted to the top of the binder-frame 3, as shown in Fig. 3. The clamp 2 is mounted on top of a lever, 4, which is pivoted at 5 to a short shaft, 6, which has suitable journals connected with the frame. The clamp 2 is therefore capable of four motions—two motions to and from the clamp 1 and two motions at right angles with these motions.

In operation, as the cord is being twisted, the two clamps are in the relative position shown in Fig. 3—one on each side of the cord, but exerting no pressure thereon. As soon as the twisting is complete the clamp 2 is moved toward clamp 1 until the twisted ends of the cord are firmly clamped, as shown in Figs. 10 and 11. Then the tucker brings the twisted ends around the end of clamp 2, as shown in Fig. 11, and tucks them under the cord which surrounds the bundle. Then the clamp 2 moves in the direction of the arrow, Fig. 3, so as to withdraw its point from within the loop formed by the tucker. Then clamp 2 moves away from clamp 1 and returns to the position shown in Fig. 3. These motions are given to clamp 2 by the cam 16, which is fast on the shaft D, and which is in the main circular, but has its periphery cut away, as at 17, Fig. 5, so that it actuates the arms 18 and 19 on the tail of lever 4.

20 and 21 are other arms projecting from the tail of lever 4 over the face of the cam front and rear. These arms are acted on by the cam-surface 22, and serve to impart to clamp 2 its motion to and from clamp 1.

23 is a pin so located as to strike the arm 20 when the arm 19 is in the recess 17 and throw the clamp 2 backward in the direction of the arrow, Fig. 3.

24 is the tucker, which may be formed as shown in the drawings. It is mounted on the end of the short shaft 25, which has the gear 26 on its opposite end. A lever, 27, having a segment-gear at its top, gives the tucker an oscillating motion through a complete revolution, and is in turn rocked back by the cam 28, fast to the shaft D. It will be observed that as the clamp 2 is held against clamp 1 by cam-surface 22 the tucker will be rocked by the cam 28, so as to tuck the twisted ends of the cord around the clamp 2, and will return to its normal position. The ends of the cord are then joined similarly to hand-binding, and as shown in Fig. 12, where the loop formed around the clamp 2 is shown at 27, and the ends 28 are shown as tucked under in contact with the bundle. The ends are twisted in the direction opposite to the twist of the cord, so that the whole is secure. The surface of clamp 1 toward clamp 2 is slightly hollowed, as shown in Fig. 9, so as to secure the cord most firmly. Until the clamps have laid hold of the twisted ends the latter are held by the cam-dogs $n$ $n'$ in groove $q$; but as soon as the clamps lay hold of the ends and the tucker is about to act the cam-recess $j^2$ acts on the flange $k'$ and lifts the shaft $k$ and twister long enough to release the ends for the action of the tucker.

When the twisting and tucking of the ends of the cord are being accomplished, it is desirable that the bundle should be compressed within the surrounding cord, so that when released from the machine these shall not be slack. With this end in view the grain-platform on each side of the opening through which the needle passes is hinged so that it may swing up and down, as shown at $a$ $a'$. This motion is imparted to the two sections $a$ $a'$ of the platform, respectively, by the links 7 and 8, each pivotally secured to the under side of one of the swinging sections $a$ $a'$.

Upon the shaft D are pivoted two arms, 9 10, which are each provided with a cam-opening of the form shown in Fig. 2, through which opening the shaft B passes. To the shaft B are fixed the two arms 11 12, which are each provided with a friction-roller, as shown, to operate on the cam-surfaces on 9 and 10. The levers 7 and 8 are pivoted to the arms 9 and 10, respectively. The swinging platform $a'$ and also $a$ are raised and lowered for each revolution of the shaft B, and since the needle $c$ is likewise raised and lowered from the same shaft by the operation of the cranks 13 and 14 and the connecting-rod 15, the platforms $a$ and $a'$ and the needle will swing with a uniform relative movement, which is timed so that the platform will be raised as the needle approaches the end of its downward stroke, and held up until the ends of the cord are twisted and cut loose and the bundle drops from the machine. The effect of all this is that as the needle descends the bundle is inclosed within the loop of cord, and the raising of the platform partially rolls the bundle over and compresses it within the loop. In this condition the ends of the cord are twisted, tucked, and cut loose, and then, the platform being still raised, there is nothing left to support the bundle, and it falls to the ground.

In describing the motions of the cord we left the needle in its downward position, as shown in Fig. 7, but with the cord passing through the eye of the needle, cut loose from the cord passing around the bundle, and its free end secured by the dog or dogs $f f' f^2$.

I will now proceed to describe what takes place as the needle ascends. The retreat of the needle commences slightly before this condition of things is reached. It commences as soon as the twister has laid hold of the cord extending between it and the loop around the bundle, so that as the twister forces the cord forward to be secured by the dogs and cut loose the backward motion of the needle yields a little slack. As the backward motion of the needle is continued, the free end being held by the dogs, the cord is compelled to pay out from the spool E.

$h$ is a finger which reciprocates in guides, and is actuated by means of the lever $h'$ and cam $h^2$, mounted on the shaft B. The form of this cam $h^2$ is such as to advance the finger $h$ as the needle recedes from its downward position, so that the cord will be caught by the finger $h$ and held, as shown in Fig. 8, until the needle has been raised within a short distance of its uppermost position. The finger then retreats and releases the cord, which affords sufficient slack to enable the needle to proceed to its uppermost position without further strain upon the dogs. By this arrangement it will be observed that the strain upon the dogs for the purpose of paying out the cord takes place on a direct line with the face of the dogs, under which circumstances they hold most securely.

It is also desirable that provision should be made so that as the needle descends a greater amount of slack should be provided for the loop around the bundle than is afforded by the distance in a straight line between the uppermost position of the eye of the needle and the dogs $f$. In order to provide this slack I employ the following devices: 29, Figs. 1 and 2, is an arm mounted on the frame, bearing upon its extremity the friction-rollers 30. At its base it is provided with the friction-roller 31. This arm is so secured to the frame that its angle of inclination with reference to the needle may be varied. The cord is passed from the spool under the friction-roller 31 and over the friction-roller 30, and thence, as shown in Fig. 2, to an eye of the needle located about the point 32, so that when the needle is in its uppermost position this eye is somewhat back of the arm 29. As now the needle descends, the amount of slack afforded will be the cord which extends between the eye at the extreme end of the needle and the dogs $f$ plus an additional amount corresponding with the distance between 30 and 32, Fig. 2. This additional amount of slack may be varied by adjusting the arm 29 at the different angles of inclination so that the operation of the machine can be accommodated to making different-sized bundles. Thus, also, sufficient cord is supplied to form the loop of the bundles without causing as much strain as might be liable to disengage the end of the cord from the dogs $f$.

It will be observed that in the binder above described the following operations are performed: First, one end of the twine (which for convenience I will call end $x$) is held by the dog or dogs $f$, and while the other end (which I will call $y$) is brought around the bundle; second, the platform rises and forces the bundle into the loop formed around it; third, end $x$ is released and is caught by one extremity of the twister and carried toward its center, and the function of holding it is transferred to the twister; fourth, end $y$ is caught by the opposite extremity of the twister and carried toward its center and cut off from the main body of twine and held by the twister; fifth, the free end of the main body of twine is caught by the dogs $f$ and finger $h$, so as to be held while the needle recedes; sixth, the ends $x$ and $y$ are twisted together; seventh, the twisted ends are clamped close up to the bundle; eighth, the twisted ends are freed from the twister; ninth, the twisted ends are tucked around the clamp and under the loop around the bundle.

The apparatus which I have described for the performance of the above operations may be greatly varied and the operations modified; but all such modifications I desire to secure.

I claim—

1. In a binding-machine, in combination, a twister and a tucker, whereby the ends of the cord are twisted together and tucked under next the bundle, a separate holding device, whereby the free end of the cord is held below the twister, mechanism whereby, before the needle has descended, the twister has revolved sufficiently to engage the cord with one of its fingers, and after the needle has descended continues its revolution to engage the cord with another finger, and a vibrating grain-platform, substantially as described.

2. The twister formed with two oppositely-projecting fingers, from the foot of each of which a groove is formed in the bottom of the twister, within which groove is located a cam-dog, substantially as described.

3. In combination with the needle whereby the cord is laid about the bundle, the twister and the cam-dogs on the under side of the twister, whereto the holding of the ends of the cord is transferred from the holding-dogs, substantially as described.

4. In a binding mechanism, a twister having fingers each of which inclines in the direction of rotation of the twister, whereby the rotation of the twister tends to carry the cord to the foot of the finger, said twister being further provided on its under side with a groove extending from the foot of each finger, within which the loose end of the cord caught by the finger enters, and said twister being further provided with a dog in each of said grooves, whereby the loose end of the cord is held, for the purpose set forth.

5. In combination, the needle, a holding device, by which the free end of the cord is held below the twister when the needle is in its raised position, the twister having fingers, a plate immediately below the twister, between which and the twister the ends of the cord are held while being twisted by the fingers of the twister, a cutting device between said plate and the first-named holding device, mechanism for imparting to the twister a partial revolution before the needle has completed its descent, and mechanism whereby, after the needle has descended, the twister completes its revolutions, all combined substantially as described, whereby the ends of the cord, when respectively released from the holding device and cut loose by the cutter, project sufficiently below the twister to be turned under and held between the twister and the plate as the twister revolves.

6. In combination, the vibrating binding-platform, the needle, actuating mechanism whereby the vibrating platform is raised as the needle descends, and the guide 30, located substantially as described, whereby when the needle is in its raised position the cord passes from this guide backward to the eye of the needle, the eye of the needle as it advances approaching nearer the guide, thereby producing a slack in the cord as the needle advances, into which the bundle is forced by the simultaneous raising of the binding-platform, substantially as described.

ALBERT GOODYEAR.

Witnesses:
LIVINGSTON GIFFORD,
CHAS. T. WORDY.